United States Patent [19]

Mehlum

[11] 4,255,066

[45] Mar. 10, 1981

[54] ARRANGEMENT FOR CONCENTRATING SEA WAVES

[75] Inventor: Even Mehlum, Oslo, Norway

[73] Assignee: Sentralinstitutt for industriell forskning, Oslo, Norway

[21] Appl. No.: 942,497

[22] Filed: Sep. 13, 1978

[30] Foreign Application Priority Data

Sep. 13, 1977 [NO] Norway ................................. 773154

[51] Int. Cl.$^3$ ............................................. E02B 9/08
[52] U.S. Cl. ........................................ 405/76; 405/35
[58] Field of Search ...................... 405/30, 31, 35, 75, 405/76, 77; 290/53

[56] References Cited

U.S. PATENT DOCUMENTS

| 1,375,232 | 4/1921 | Rush | 405/31 |
| 2,441,759 | 5/1948 | Gay | 405/77 |
| 2,886,951 | 5/1959 | Valembois | 405/31 |

FOREIGN PATENT DOCUMENTS 2507330  8/1975  Fed. Rep. of Germany .

OTHER PUBLICATIONS

"Linear and Nonlinear Waves", G. B. Whitham, London 1973, Chapter 13, pp. 431-484.

Primary Examiner—David H. Corbin
Attorney, Agent, or Firm—Wenderoth, Lind & Ponack

[57] ABSTRACT

An arrangement for concentrating sea waves, includes a grid-like structure of stopping and/or delaying elements adapted to influence the amplitude and/or phase of the waves and located in such positions in the water that the elements in interaction with the incident sea waves form an interference pattern which gives a concentration of the wave energy in a limited area (concentration area). When the wave energy is to be utilized for power production, the grid-like element structure is designed to give a concentration of the wave energy in a concentration area located in the short-range field of the element structure. Preferably the elements in the structure are mainly situated in front of the concentration area with respect to the dominant wave incident directions. Moreover, the element structure may have an extension (aperture) which is substantially larger than the wave length of the dominant waves at the location.

12 Claims, 13 Drawing Figures

ARRANGEMENT FOR CONCENTRATING SEA WAVES

BACKGROUND OF THE INVENTION

In the past a number of proposals have been set forth for the utilization of the energy in water waves, in particular sea waves. Energy production on the basis of sea waves has attracted renewed interest during recent years because of future energy supply problems.

A disadvantage of sea energy as it is available in nature is that the energy density is low, which is reflected in the rather extensive and thereby expensive constructions which have been proposed for transforming the energy of the wave motion to electric power for example. Certain attempts to obtain a collection or concentration of the wave energy over a length of the wave front are shown for example in U.S. Pat. No. 2,441,759 and German published patent application No. 2,507,330. Both these proposals are directed to the employment of funnel-shaped channels which narrow towards a restricted area in which the utilization of the wave energy can take place. It is evident that constructions of this kind cannot in practice be built with dimensions of a significant size for power supply purposes, since technical difficulties and economic considerations will set a limit to such arrangements.

SUMMARY OF THE INVENTION

The present invention is based on a quite different idea than the above previous proposals and opens possibilities for collecting or concentrating sea wave energy from considerably larger lengths of the wave front without increasing the construction expenses correspondingly. Moreover, this invention can also be used for establishing quiet, more or less wave-free areas in the sea, for example at harbours and quaies or at oil drilling platforms and the like. What is contemplated here is an effect which is complementary to the above mentioned concentration effect and can apparently be utilized in combination therewith, i.e. by concentrating the energy at a wave power plant and to utilize the resulting wave-free area for harbour purposes and the like. Another possible utilization is for ice breaking, for example by concentrating the energy to a channel-shaped area bounded by two substantially parallel lines so that a corresponding open lane is broken through the ice.

What is novel and specific in an arrangement for concentrating sea waves accoridng to the present invention primarily consists in a grid-like structure of stopping and/or delaying elements adapted to influence the amplitude and/or phase of the waves and located in such positions in the water that the elements in interaction with the incident sea waves form an interference pattern which gives a concentration of the wave energy in a limited area (concentration area).

In arrangements where the wave energy is to be used for power production it is an important feature according to the invention that the element structure is adapted to give a concentration of the wave energy in a concentration area located in the short-range field of the element structure. In order applications, for example ice breaking, also the distant field of the interference pattern from the element structure may be utilized, as the strong concentration which is only possible in the short-range field, in many instances is not necessary in order to obtain a sufficient effect of the kind desired.

Accordingly, this invention is based on the employment of a grid-like structure or diffraction structure in analogy with structures known from optics or from antennas for electromagnetic waves for communication purposes. By suitable form and dimensions of such a diffraction structure for water waves it is possible to establish interference patterns, inter alia, for concentrating the wave energy in a small area. Such a grid structure does not necessarily have to take a simple geometric shape, for example with elements being located along a straight or curved line, but can also be brought to give a desired form of wave inerference in water by arranging the elements in the structure in various and different ways.

When there is here referred to "stopping or delaying elements" it is to be understood that the elements may be adapted to influence the amplitude and/or phase of the waves. Thus, a stopping element may serve to influence the wave amplitude to such a degree that the waves are locally completely stopped, i.e. that the amplitude behind the element is reduced to zero, whereas the waves are passing through at other places in the grid and contribute to the establishment of an inerference pattern. Delaying elements are elements which influence the phase of the waves and thereby contribute to the establishment of an interference pattern. In this connection it is very important to note that elements of the type which form a phase grid will have a much higher efficiency in such arrangements than stopping elements which only influence the amplutide of the waves. Therefore, there is every reason to prefer or aim at an element structure which mainly influences the phase of the waves. In practice the elements employed may have influence both on amplitude and phase, but it is preferred to a largest possible degree to let such arrangement be based on influencing the phase of the waves.

The reason why a phase grid or delaying elements are more efficient is that they do not significantly reduce the flow of wave energy through the structure. Stopping elements, however, will always reflect some wave energy so that less energy will flow through the structure.

A single installation, structure or arrangement may include stopping elements (influencing amplitude) as well as delaying elements (influencing phase).

It is the short-range field of the wave interference pattern which is of interest in connection with the concentration of sea waves for energy production, as an essential idea of this invention consists therein that in analogy with optical microscope geometry it is possible to arrange the element structure in such a way that waves with various incident wave directions are focused at substantially the same point or concentration area, which can also be referred to as a focal area. This focal area therefore is that area in the short-range field of the element structure which is covered by the various and adjacent focal points of differently incident waves against the element structure. As far as the distant field is concerned the various focal points in practice will have so large a spacing that a sufficient concentration for power production may not be obtained. Besides, the distant field will usually be so much disturbed by extraneous incident waves that the intended concentration in a limited area is still more reduced.

What is explained immediately above will be evident to any one familiar with wave theory by analogy with optics or other electromagnetic waves. It shall be pointed out, however, that utilization of the short-range field is not absolutely necessary for wave energy production, but it is much preferred to locate the focal area in the short-range field in arrangements for power production purposes.

The most important factor or parameter affecting the short-range field is the element structure's ability to concentrate waves with various incident wave directions in the concentration of focal area mentioned above. Another parameter of importance is that within the limitations defined below waves of different frequencies will concentrate to a satisfactory degree.

When a given installation or arrangement is being planned, computations will be carried out in a way similar to what is traditional in the building or mechanical arts, i.e. by choosing a configuration and dimensions and then calculate the consequences thereof, and in connection with the present invention one such consequence or result is obtained by means of the rule referred to below. If the configuration and dimensions (parameters) first chosen do not satisfy the requirements, inter alia, what is required by the rule below, another choice must be made and the computations repeated until a satisfactory result is obtained.

How far the short-range field extends in relation to the diffraction structure in water may vary. In connection with this invention it has been found, however, that for the plurality of practical cases it will be correct to set a limit to the extension of the short-range field by the following rule:

If the largest dimension across the whole element structure is $D_{max}$ and the distance between the concentration area and the closest element in the structure is $A_{min}$, then the concentration area is inside the short-range field when $$\text{Arc tan} \frac{D_{max}}{2A_{min}} < \text{about } 20°$$

The above "largest dimension" is the distance between the two elements being most remote from each other in the structure, which usually will be the length of the structure in a direction normal to the dominant wave propagation direction. How far the concentration area shall be positioned from the element structure within the above limitations of the short-range field depends upon many factors, such as bottom topography and wave characteristics at the location of the installation.

It is preferred that at least some of the elements are adjustable, for example by being displaceable as to position and orientation in space, for adaption and adjustment for example in order to take into account changes in the direction of the incident waves, but in particular to take into account large or destructive waves which may occur in bad weather. By concentration of such large waves the destructive effect may be catastrophic and it is therefore in such situations desirable to be able to modify or cancel the concentrating effect of the structure.

The construction of the elements may be varied in several ways. The elements may be mounted to stand fixed on the sea bottom, or they may be anchored, possibly held in position by means of dynamic positioning systems. Thus, for example, according to the circumstances the elements may be formed by concrete blocks or regular vessels, i.e. large ships such as tankers or the like (alternative as wrecks) which are suitably positioned so as to form a grid structure of the desired configuration. As another extreme it is mentioned that also naturally existing elements, such as islets and skerries or the like may be utilized as elements in the grid structure at the actual place for the arrangement. In such cases the positioning of the artificial elements must be determined in relation to the already existing natural elements. These natural elements can of course according to the circumstances and the existing possibilities, be modified by blasting or adding structure so that a suitable effect thereof is obtained. Although elements are mentioned here which individually act separately in the grid structure in co-operation with other elements, there may be though of element constructions which form a continuous structure, for example an elongate hose-like structure which at certain points or portions protrudes towards or above the water surface to form separate elements, but which for the rest are so much immersed that the effect of the construction on the waves in the intermediate portions is not noticeable.

As will have appeared from the above there are many degrees of freedom as regards the construction and the arrangement of the elements in a grid structure. What is contemplated here is in the first place position, not only in the horizontal plane, but also vertically, i.e. with respect to the water surface, and in the second place orientation, i.e. in azimuth and/or elevation in so far as one does not have to do with elements of a spherical symmetry, and finally the elements may have the most different shape and sizes depending upon the effect desired in the grid structure. In addition to the availability of these construction parameters or variation possibilities for fixed and stationary elements, there may be built elements which are adjustable in the above respect, i.e. as to position, orientation, shape and size. Thus, an adjustable shape and size can be thought of in connection with the above hose-like structure.

When employing the here proposed separate elements in a grid-like structure it will be understood that arrangements for energy production on the basis of sea waves may have a very large length or extension, for example of the order of magnitude of several kilometers or possibly as much as several tens of kilometers, in particular when naturally existing elements may be utilized, such as coral-reefs with openings blasted out. It is therefore by means of the invention possible in a single power plant to utilize the wave energy across a far larger region or coast length than what has been considered possible technically and economically by means of previously proposed solutions.

Even though installations for energy transformation as such are not included by the present invention, some possibilities are briefly mentioned here. The element structure can for example be arranged in such a way outwardly of a coast line that the concentration or focal area is positioned in an inlet or a bay which ends in a natural or blast-out cleft which leads to a higher basin the head of which can be utilized in a turbine installation of conventional type. By arrangement at sea far from the shore the concentrated wave energy may be utilized by means of a construction similar to a drilling platform having a large hydraulic pump or scoops between its legs, possibly with water lifting equipment and with a basin mounted thereon, for the production of electric power. The latter can be transferred to the shore through a sea cable.

When using the present invention for power production it is very important to be able to adjust the element structure for each individual place or site, or that the diffraction structure may be optimized for obtaining the best possible concentration of the energy in a limited area in which the transformation to useful power shall take place. There is a large number of factors which must be taken in account in the planning of such an arrangement and mathematical calculations play an important role for the determination of the configuration of the structure and the form of the elements. The fundamental mathematical and theoretical apparatus for the treatment of wave fields of the kind concerned here has in principle been available for a long time, and has been treated for example in G. B. Whitham: Linear and Nonlinear Waves (Chapter 13), London 1973. Reference is made in particular to the differential equations 13.22 on page 437 of this book. These differential equations must be solved taking into account the boundary conditions arising from the desired configuration of the element structure.

The previously mentioned computations or calculations are made on the basis of the above equations and the parameters involved are shape, size and position of the elements (whether artificial or natural formations) to be utilized. As to the waves the single significant parameter is their phase. What is essential is to establish an element structure having such influence on the incident waves that the resulting output wave has a circular wave front, which leads to concentration of the wave energy in the focal area.

It is important during the calculations on the basis of the theoretical fundament to consider closely which approximations are acceptable in order that the result shall be useful in practice for the purposes concerned here. It is, moreover, of substantial significance for this invention to recognize certain physical conditions in sea waves, namely the frequency spectrum thereof and the angular spread of directions around the main direction within which the waves usually fall at a given place. When in this connection reference is made to sea waves, this means the long and powerful swells which more or less at all times roll across the larger ocean regions and eventually fall against some coast. After systematic measurements and analyses it has been found that such waves have a rather narrow band frequency spectrum, which has an important bearing on the usefulness of this invention, as a higher efficiency is obtained with a narrower frequency spectrum.

A realistic, practical example in this regard may be as follows. In terms of period, which is the inverse of frequency, a common wave period is 10 sec. An element structure according to this invention will then result in an acceptable concentration of wave energy with a deviation in period of 20 percent, i.e. for a range of periods between 8 sec. and 12 sec. As to angular or directional deviation, a range of angles up to 30° to both sides of the center line or main direction is acceptable. The figures given as examples here correspond with the limit of about 20° given above with respect to the short-range field. It will be understood that the design of the element structure is less complicated if the angular spread or deviation of wave directions from the main direction is small. Waves that are incident from directions outside the angular range for which the structure is designed, will not be focused properly.

When energy is to be extracted from the waves in the short-range field the means or equipment provided for this purpose will also have an influence on the wave interference pattern. The method of extracting energy must therefore be taken into account when designing the element structure. This is in analogy with what is known in connection with electromagnetic waves.

BRIEF DESCRIPTION OF THE DRAWINGS

The invention shall now be explained by means of some exemplary embodiments thereof, with reference to the attached drawings, in which.

DETAILED DESCRIPTION OF THE INVENTION

Figure 1:
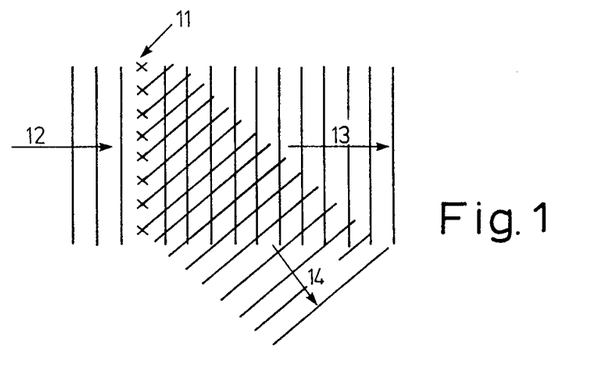
FIG. 1 is a schematic illustration of a known diffraction structure for diffracting light waves.

FIG. 1 shows the principle for a usual optical grating or grid 11 in which the distance between the points of the grating is constant. Plane light waves 12 which hit the grating will be diffracted in certain directions as indicated by arrows 13 and 14, determined by the wave length of the plane waves 12 and by the distance between the points of the grating. It is known that a corresponding grating or grid in water will deflect water waves in a corresponding way.

Figure 2:
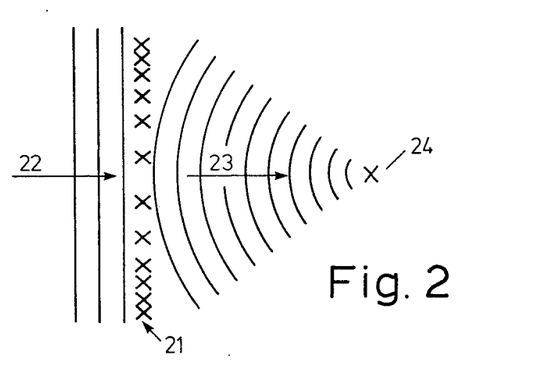
FIG. 2 is a schematic illustration of a known diffraction structure for focusing light waves.

In FIG. 2 there is shown a diffracting structure 21 in which the grid point spacing decreases from the center and outwardly similar to the structure of a Fresnel-zone plate. With a correctly determined structure plane light waves 22 which hit the grid 21 will result in converging spherical waves 23 and a portion of the energy will be focused in an area 24. The idea behind the present invention is to utilize this optical phenomenon for concentrating sea wave energy for power production.

Figure 3:
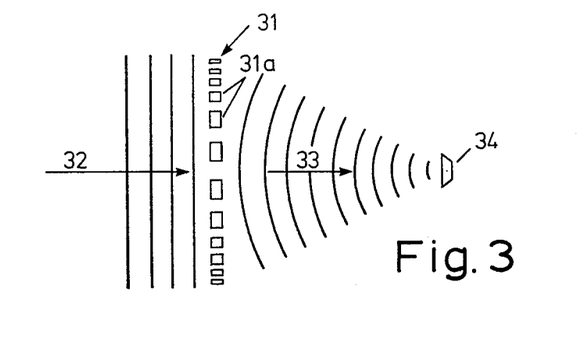
FIG. 3 is a schematic illustration of the principle for focusing water waves.

Extensive calculations and experiments have shown that water waves can be focused by means of a diffraction structure in the same way as light waves. The principle of water wave focusing is shown in FIG. 3. The diffraction structure is also here a grid-like structure 31 which consists of stopping or delaying elements 31a adapted to influence the amplitude and/or phase of the water waves. The elements are dimensioned and positioned in such a way in the water that in interaction with incident water waves 32 they form an interference pattern to the effect that the plane water waves 32 become converging circular waves 33 which give a concentration of the wave energy in a limited area in which a power station 34 can be located.

For power production purposes the element structure is most preferably calculated for concentrating the wave energy in a focal area located in the short-range field of the element structure. Whether the element structure shall exist in the form of stopping elements or delaying elements will to a certain degree depend on the topographical conditions at the bottom of the sea where the structure shall be located. In other words the natural formations may lend themselves to utilization either as stopping elements or as delaying elements, the latter being necessarily more or less flush with the water, such as elements 95 in FIG. 9. It can be shown mathematically, however, that an element structure which influences the amplitude of the waves, lets through a far smaller portion of the wave energy than an element structure which influences the phase of the waves. It can be mentioned here that the theoretical maximum efficiency of an ideal amplitude grid (i.e. consisting of very rigid or stiff elements) is 12.5%, while an ideal phase grid has a theoretical efficiency of 100% as a maximum. It will often be of interest to have an element structure which is a combination of an amplitude grid and a phase grid, since a single installation apparently may include stopping elements influencing amplitude, as well as delaying elements influencing phase.

Although it is still too early to show which amounts of energy can be taken from sea waves by means of arrangements according to the invention, a moderate estimate shall here be given. A reasonable figure for the average power of the sea waves in the North Atlantic is 50 kW per meter. An arrangement for concentrating sea wave energy can for example extend over ten kilometers. Nominally then 500 MW is available. With a modest assumption it is believed that this power can be brought to the focal area of a phase grid with an efficiency of 50%, and that the energy tapping in the power station can take place at an efficiency of 40%. These assumptions give a power station producing an average of 100 MW. The production per year will be 800 GWh, which is comparable to the development of a major watercourse.

Figure 4:
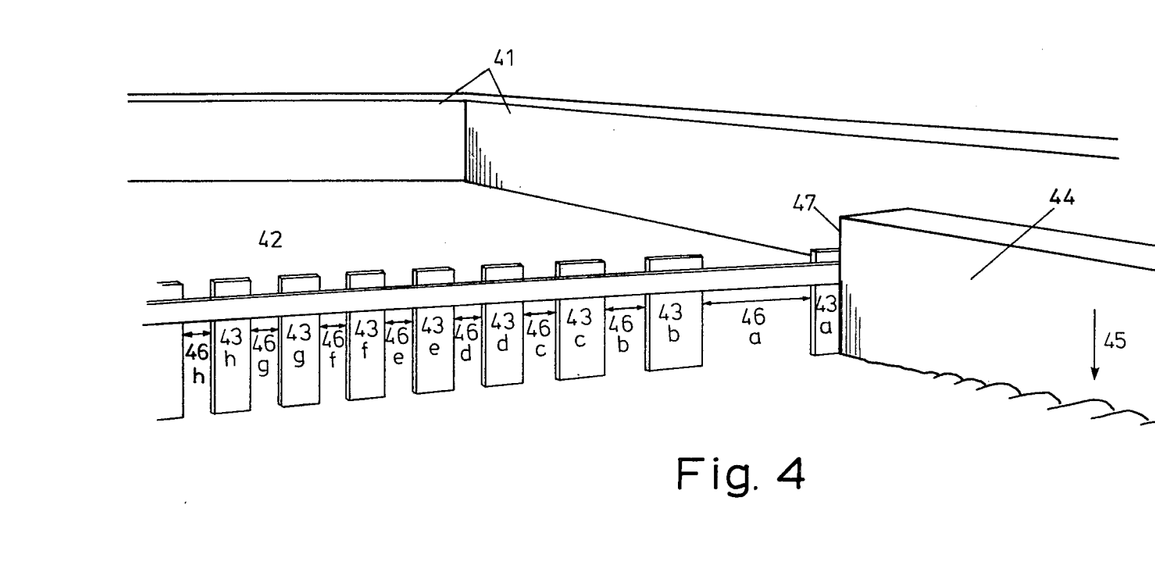
FIG. 4 is a perspective view of a set-up used during experiments for testing an amplitude grid.

An element structure as indicated in FIG. 3 was dimensioned for tests in a large water tank. The results of the tests are tentatively illustrated in FIG. 4. In FIG. 4 two of the walls of the tank are designated 41. The water surface is designated 42. In the tests there was employed a grid formed of a limited number of openings or passages, namely twelve openings (of which only eight openings 46a–46h are shown in FIG. 4) forming one half of an amplitude grid which was divided by means of a wall 44 which was painted white in order to make it easier to study the wave picture adjacent to and at the focus 45. The openings 46 in the grid structure were defined by stopping elements 43 mounted in such a way that they reached the bottom of the tank. The depth was 0.5 m. Behind the elements 43 there was provided a wave generator (not shown) which emitted plane waves with a wave height of about 2 cm against the grid.

In these tests there was employed a wave length of 25 cm. The focal distance, i.e. the distance from the arrow 45 was 220 cm. The length of the grid was about 450 cm. The width of the stopping elements and of the openings appear from the table below, in which A is the distance between corner 47 and the nearest edge of an opening and B is the distance between the corner 47 and the remote ends of the corresponding opening, as seen in the measured direction.

| Opening number | A cm | B cm |
| --- | --- | --- |
| 1 | 10.0 | 75.9 |
| 2 | 108.3 | 134.3 |
| 3 | 156.9 | 177.6 |
| 4 | 196.9 | 215.2 |
| 5 | 232.7 | 249.6 |
| 6 | 266.1 | 282.1 |
| 7 | 297.8 | 313.2 |
| 8 | 328.3 | 343.3 |
| 9 | 358.0 | 372.6 |
| 10 | 387.1 | 401.4 |
| 11 | 415.6 | 429.7 |
| 12 | 443.7 | 457.6 |

With interference the waves in these experiments are propagated mainly as circular waves in the direction towards focus, and against the wall 44 it can be seen how the wave height builds up and reaches its maximum in at the focus (marked by arrow 45), and the wave height thereafter decreases. The wave height immediately after the openings 46 was about 1 cm and the wave height in focus 45 was about 4 cm.

It is remarked that these laboratory experiments were conducted exclusively to show the principle and that these are not meant as a measure of what can be obtained with sea waves in practice.

Figure 5:
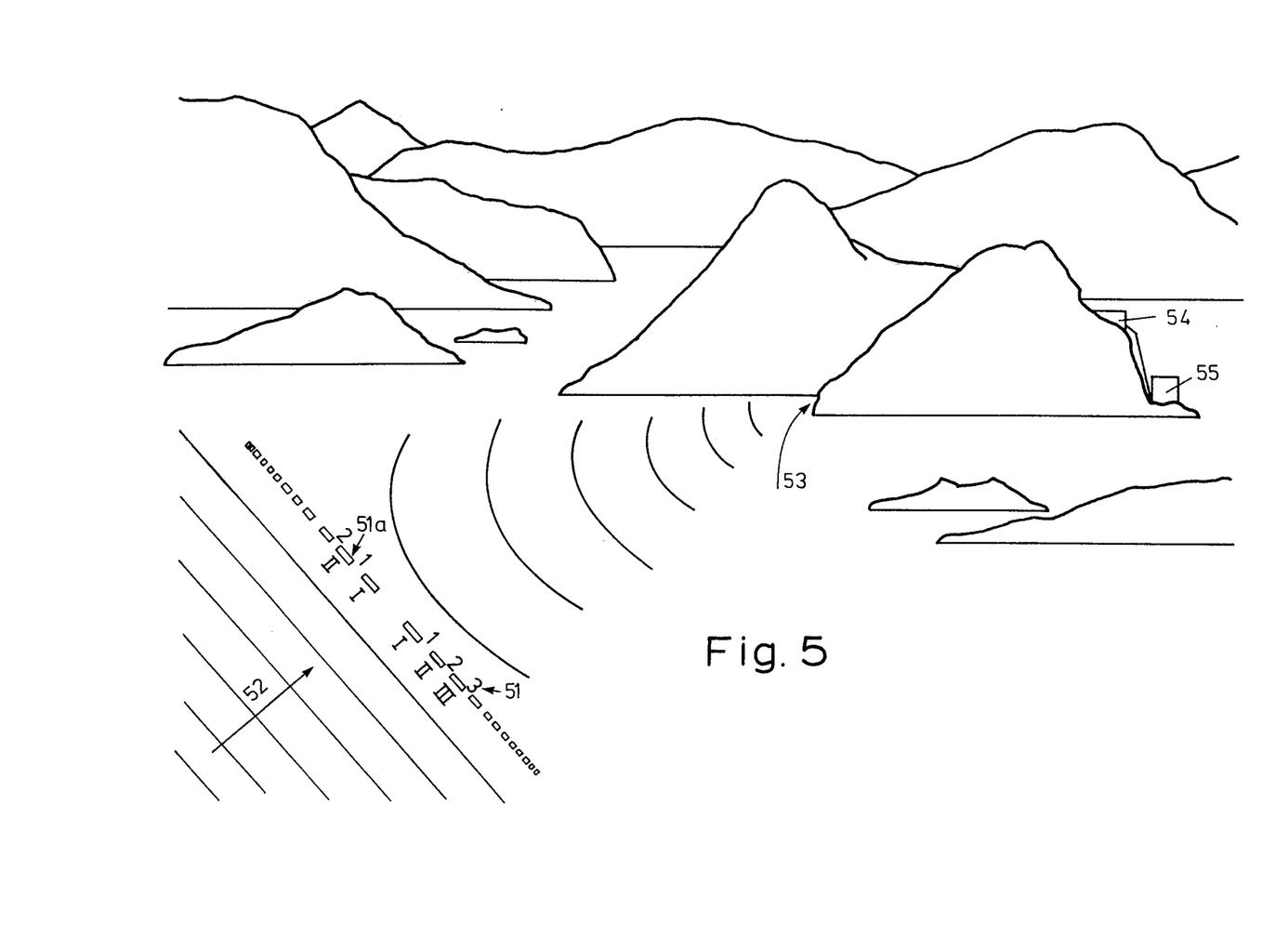
FIG. 5 is a perspective view illustrating sea wave concentration in practice by means of an amplitude grid.

In FIG. 5 there is shown a structure 51 carrying 23 openings and 24 stopping elements 51a located outside a part of a coast. The elements 51a are arranged along a straight line and transversally to the dominant wave incident direction as indicated with arrow 52. The elements 51a are so positioned and mutually arranged that the focal area 53 is located in a bay outside a naturally existing or blast-out rock cleft which leads to an elevated basin as indicated at 54. A conventional power station 55 with a high voltage transmission network is built on the lee side. Alternatively, the wave energy in the focal area can drive a large hydraulic pump for lifting water into the basin 54.

Figure 6:
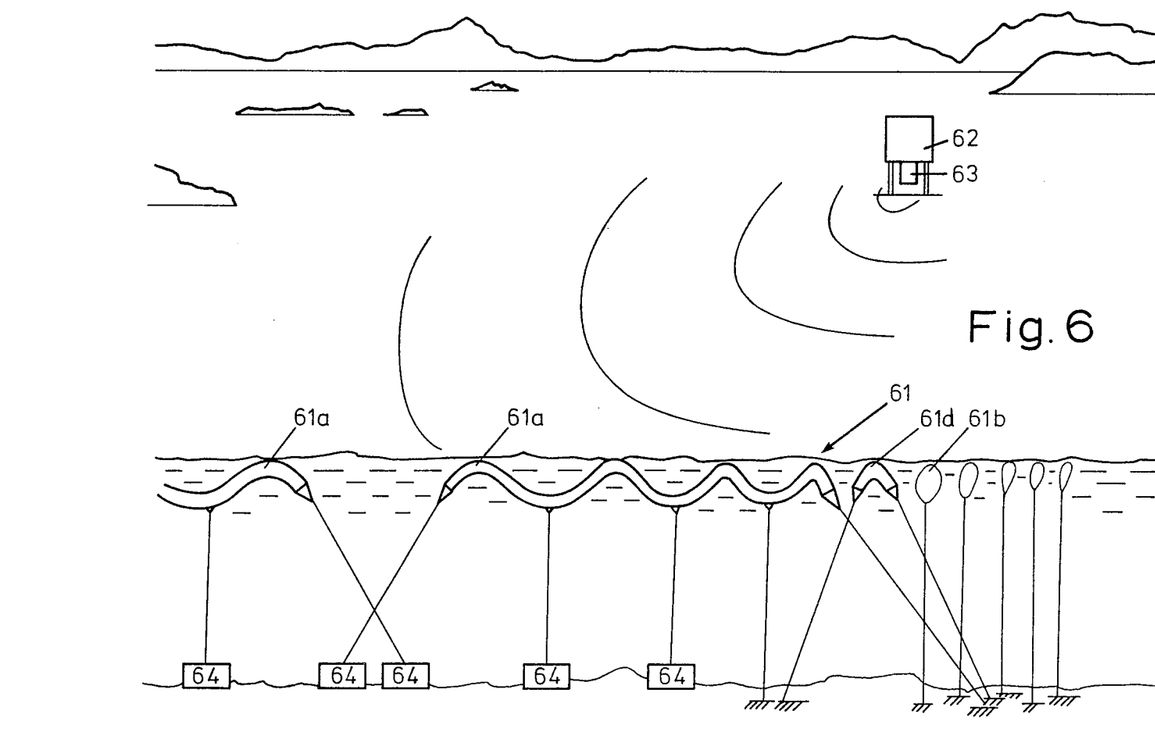
FIG. 6 is a perspective view showing the employment of a phase grid.

In FIG. 6 there is shown a structure 61 of delaying elements 61a, 61b and 61d located with an extension of some kilometers at sea. In the focal area there is located a platform 62 having a scoop wheel 63 or other means for utilizing the concentrated wave energy. As an alternative the platform 62 may comprise a pump arrangement, a basin and a turbine house. Electric power being produced can be conducted to the shore through a sea cable. The elements 61a and 61d consist of anchored air-filled hoses, whereas the elements 61b consist of anchored buoys. Some of the elements can be anchored to remotely controlled winches 64.

Figure 7:
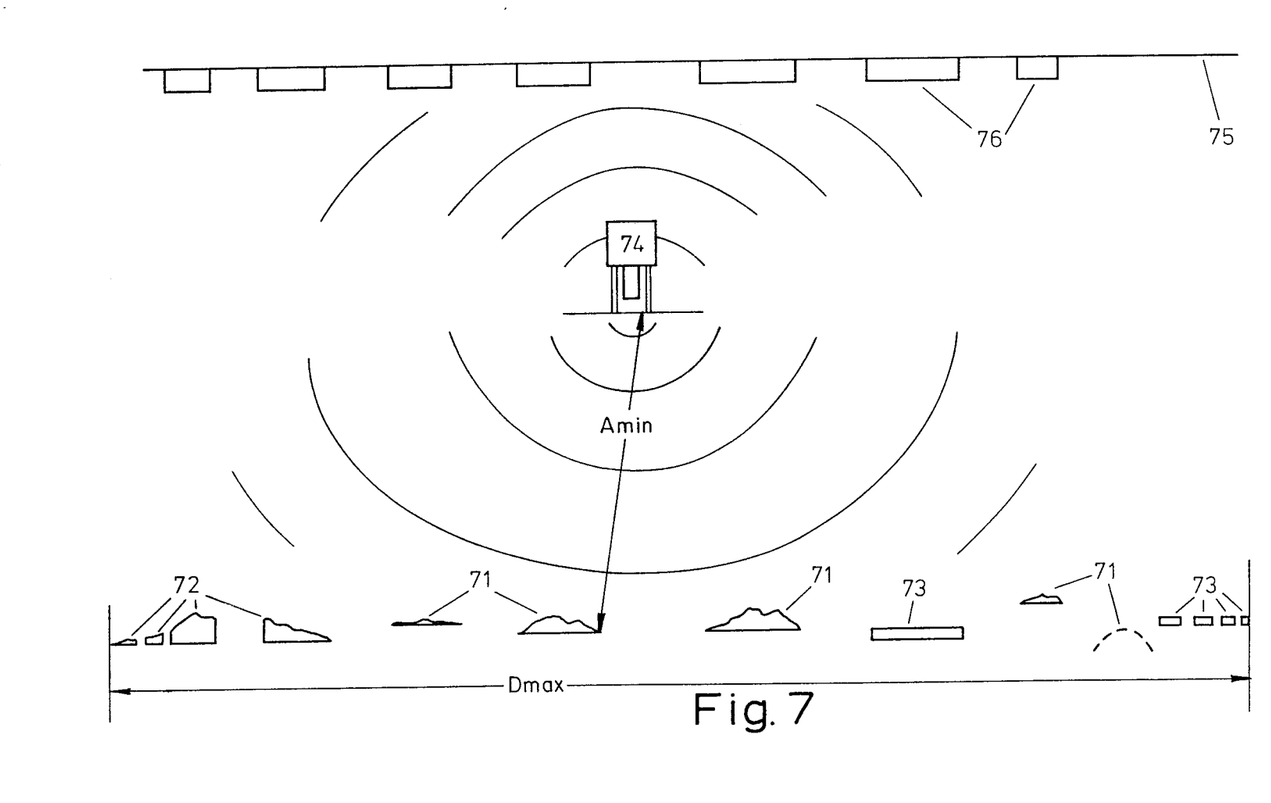
FIG. 7 is a schematic view illustrating the utilization of naturally existing stopping elements.

In FIG. 7 there is shown an amplitude grid consisting mainly of stopping elements in the form of islets, rocks and skerries 71, which do not necessarily have to lie on a straight line. Other elements 72 are formed by blasting of an islet. The grid is completed by building stopping elements 73. Alternatively, these could be delaying elements. A platform 74 with equipment for transforming wave energy to mechanical/electrical energy is located in the focal area of the grid. A steep coast part 75 with deep water serves to reflect waves back towards the focal area in which there will exist a standing wave pattern. There is also provided a phase grid 76 preferably at a short distance from the steep part 75 for contributing to the concentration of the reflected waves at the focal area. In the calculation in this case it must be taken into account that the grid 71, 72, 73 interacts with the reflecting part 75 and with the phase grid 76 and possibly also that there is provided for tapping of energy from the wave field.

Figure 8:
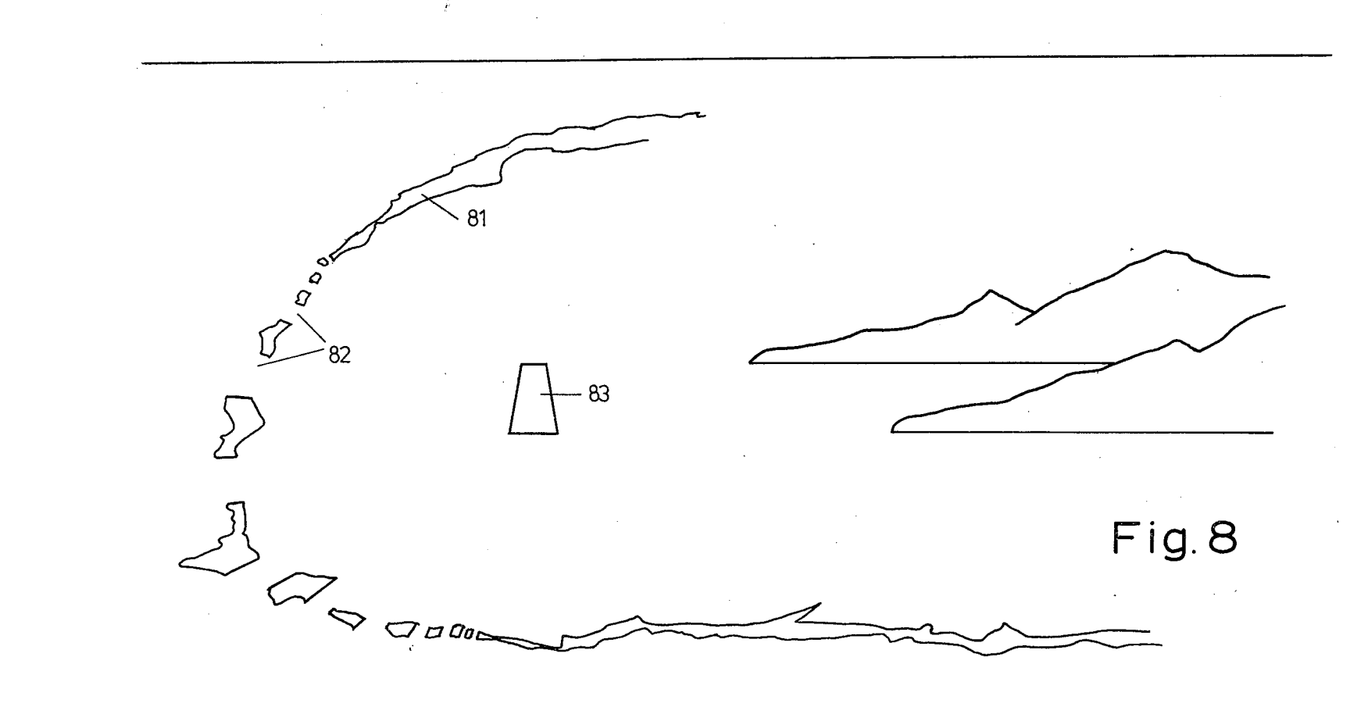
FIG. 8 is a perspective view of the utilization of a modified coral reef as an amplitude grid.

In FIG. 8 there is shown a coral-reef 81 modified as an amplitude grid by blastings 82 for concentrating sea wave energy at an offshore power station 83 in the short-range field of the grid. In the Figure there are shown 13 openings, while 20 to 50 would be natural. Since there are coral-reefs which can form an aperture of as much as 1000 kilometers, a few hundred openings will be of interest in such cases. In trade wind regions the wave length is about 300 meters. In the focal area the wave height can be expected to be 50 meters, which indicates the large amount of energy available.

Figure 9:
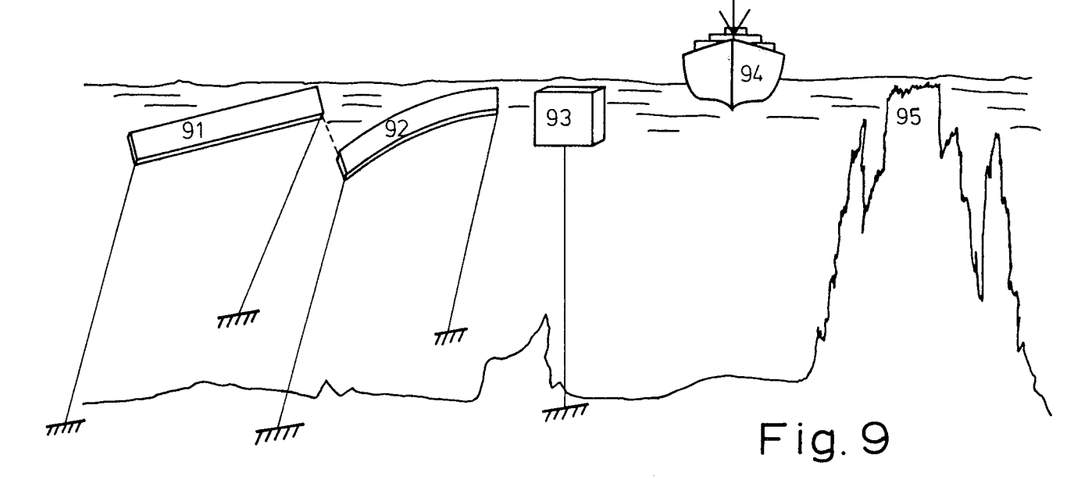
FIG. 9 is a schematic view showing alternative delaying elements.

In FIG. 9 there is shown an anchored delaying element 91 formed as a cylinder or plate having horizontal dimensions of an order of magnitude corresponding to 1 wave length, and being anchored to the bottom, whereas the element 92 is a corresponding object, but curved in one or another direction depending upon the conditions. The elements 91 and 92 may be connected to each other as indicated with a dotted line. Because of the size of the elements it can be practical to build them up of more easily handled sections. The element 93 is a cubical air tank whereas the element 94 represents a large ship which may be anchored or kept in position by its own machinery. The element 95 is a natural shelf.

The generally plane and plate-like element 91 shown in FIG. 9 will, in a substantially horizontal orientation in the water, essentially have influence on the phase of the waves. Such an element should in this case be located so deep in the water that the deepest troughs of the waves to be influenced, do not reach down to the element or elements, i.e., the waves should normally not break thereover.

Figure 10:
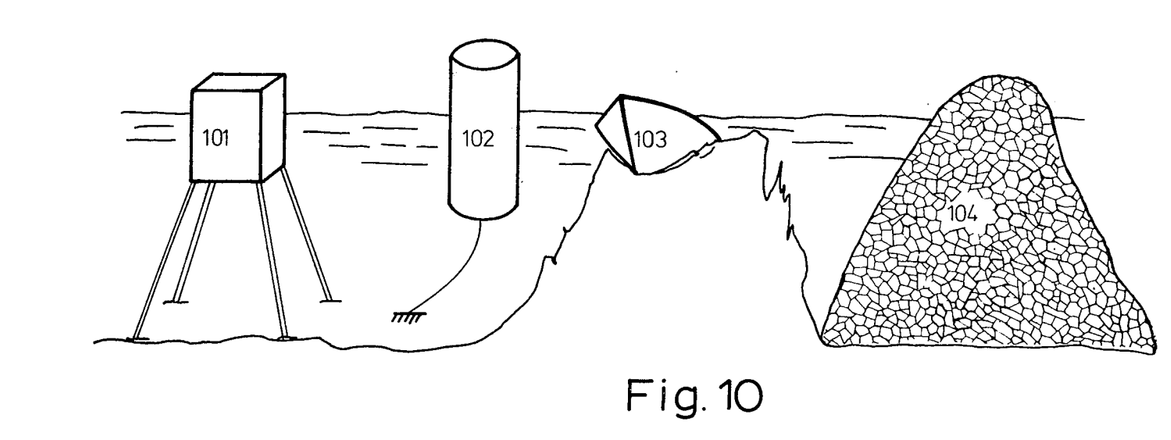
FIG. 10 is a schematic view showing alternative stopping elements.

In FIG. 10 there is shown a stopping element 101 formed as a concrete block being anchored to the bottom by means of legs. Moreover, there is shown a cylindrical element 102 with an anchoring rope fixed to the bottom. The element 103 is a wrecked ship whereas the element 104 is an artificial rock.

Figures 11A, 11B:
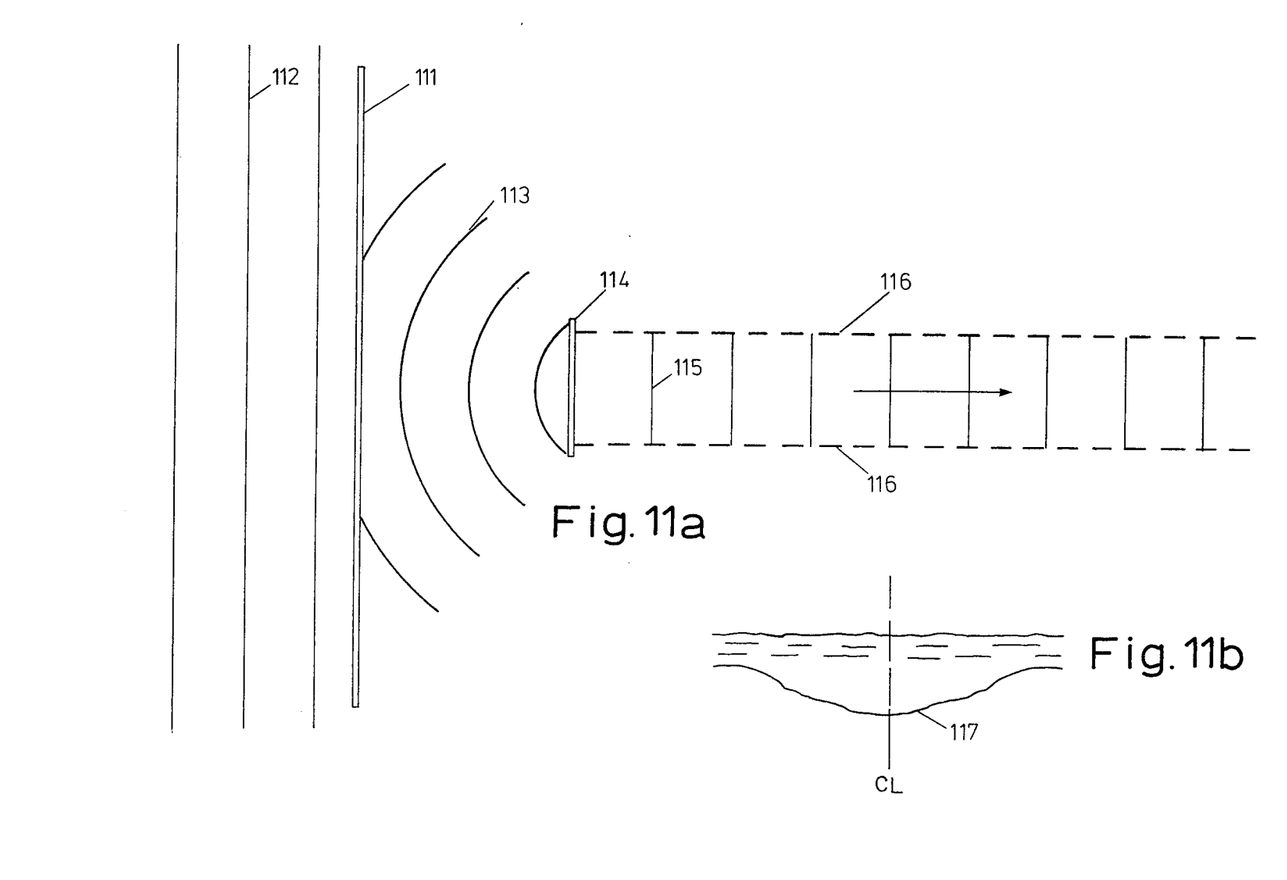
FIG. 11a and 11b are schematic views showing a combined arrangement.

In FIG. 11a there is indicated an amplitude or phase grid 111 for focusing plane waves 112 as shown with concentric rings 113. In front of the focal area in the short-range field there is located another grid 114 for example a phase grid which delays the phase of the circular waves outwardly to both sides from the center of the grid 114 so that plane waves 115 with enlarged wave height propagate in the direction of the arrow. Alternatively, the grid 114 can be formed of a natural bottom formation as indicated in FIG. 11b. Here the bottom portion 117 forms a phase grid. Thus, FIG. 11b shows a transverse section in a plane corresponding to grid 114 with a symmetric bottom contour 117 on both sides of a center line or axis CL. The shallower portions with increasing distance from line CL result in increasing delays of the wave front, so that the incident converging circular wave 113 is transformed into a plane wave 115 of reduced width. Accordingly, grid 114 or bottom portion 117 have a structure and an effect being the inverse of grid 111.

The set-up of FIG. 11a can be used for energy production as well as for the breaking of ice. Thus, grid 114 may have provisions for angular displacement in azimuth so that the plane waves 115 can be directed at different angles into the ice for breaking a correspondingly fan shaped lane therein. The angular displacement of grid 114 can be brought about by individually moving elements of the grid, such elements being for example of the same type as elements 61a in FIG. 6.

With the focal area of the grid 111 located near to or at the shore a constructed channel 116 can lead the waves 115 to an elevated basin for power production.

The grids 111 and 114 in the arrangement of FIG. 11a can also be regarded as parts of a single larger element structure, in which the grid 111 forms a concentrating main structure part and the grid 114 forms a dispersing auxiliary structure part located in the short-range field from the grid 111.

Figure 12:
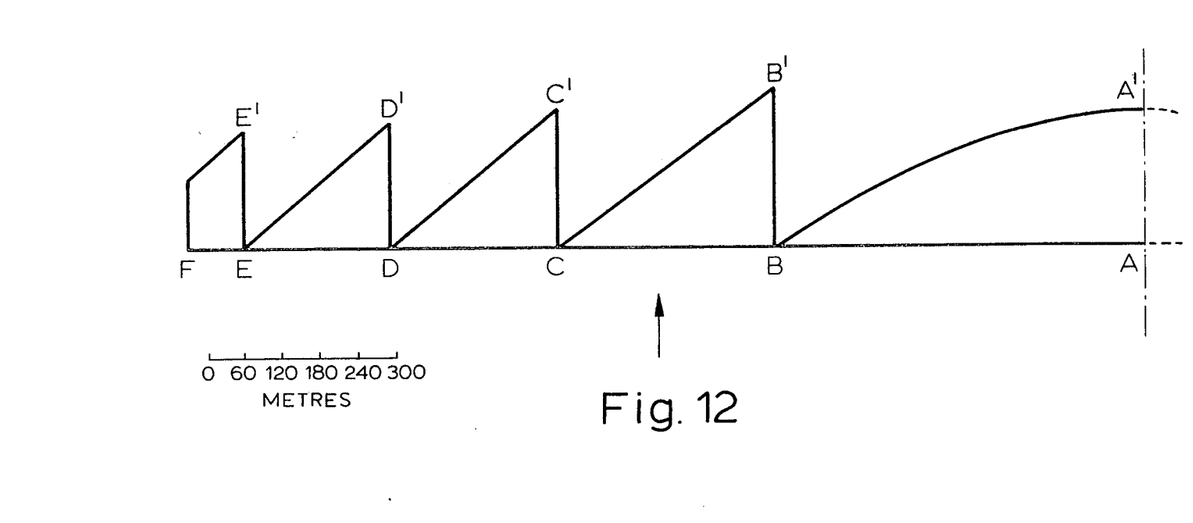
FIG. 12 is a graph showing in detail the contour of delaying elements calculated for a practical arrangement.

The specific example of a structure of delaying elements shown in FIG. 12 is calculated for a wave-length of 150 m, and the drawing is scaled down so that one cm represents 60 m of actual size. FIG. 12 shows only one half of the complete structure (line A—A' being an axis of symmetry). There is shown the contour of five elements AA'B–BB'C–CC'D–DD'E and EE'F. These elements are designed to be located horizontally in the water at a depth of 16.8 m. The thickness of the elements is determined by constructional and strength considerations, and may be for example 5 m.

This structure is designed to have an acceptable concentration effect within a variation of 10% in the wave period.

The arrow in FIG. 12 shows the direction of wave incidence.

I claim:

1. A system for concentrating water wave energy, said system comprising an off-shore grid-like means for transforming substantially rectilinear fronts of incident water waves into substantially arch-like water wave fronts with concentrated wave energy in a common central area spaced from said grid-like means, said grid-like means comprising a structure formed of a series of interacting water wave stopping and/or delaying elements arranged substantially transversely of a primary direction of propagation of said incident water waves, and said elements being relatively dimensioned such that elements and spacings therebetween in a central portion of said series of elements have larger dimensions in the longitudinal direction of said series than elements and spacings therebetween remote from said central portion.

2. A system as claimed in claim 1, wherein said common central area is situated behind said grid-like means, as viewed in said primary direction of propagation of said incident water waves.

3. A system as claimed in claim 2, wherein said concentrated wave energy is to be utilized for power production, and wherein said common central area is located within a sector defined by:

$$\text{Arc tan} \frac{D_{max}}{2A_{min}} < \text{about } 20°$$

wherein:

$D_{max}$ = the largest dimension of said series of stopping and/or delaying elements; and $A_{min}$ = the distance between said common central area and the closest said element in said central portion of said series of elements, said sector thus encompassing a short-range field of said series of elements.

4. A system as claimed in claim 2, wherein said grid-like means further comprises wave-diverging means positioned between said series of elements and said common central area.

5. A system as claimed in claim 2, further comprising wave reflection means positioned behind said grid-like means and behind said common central area, as viewed in said primary direction of propagation of said incident water waves.

6. A system as claimed in claim 1, wherein the width of said grid-like means, as measured along said incident water waves, exceeds the largest wave lengths of said waves.

7. A system as claimed in claim 1, wherein said grid-like means comprises at least one said element in the form of an interacting natural formation, for instance a rock, that may have been artificially shaped to improve interaction with neighboring said elements, for instance by blasting.

8. A system as claimed in claim 1, wherein at least one of said elements is located below the water surface.

9. A system as claimed in claim 8, wherein at least one of said elements is resilient to said incident water waves.

10. A system as claimed in claim 8, wherein at least one of said elements comprises a plate-shaped member which is substantially horizontally oriented in the water at a depth therein that said incident water waves do not break on the member.

11. A system as claimed in claim 1, wherein at least one of said elements is adjustable in size and shape in a controlled manner.

12. A system as claimed in claim 1, further comprising means, associated with at least one of said elements, for displacing said at least one element with respect to position and/or orientation in a controlled manner.

* * * * *